April 29, 1952     W. G. MARTENS, JR     2,594,957
MULTIPLE UNIT SELF-CLEANING DUST FILTER
Filed Oct. 12, 1949     3 Sheets-Sheet 1
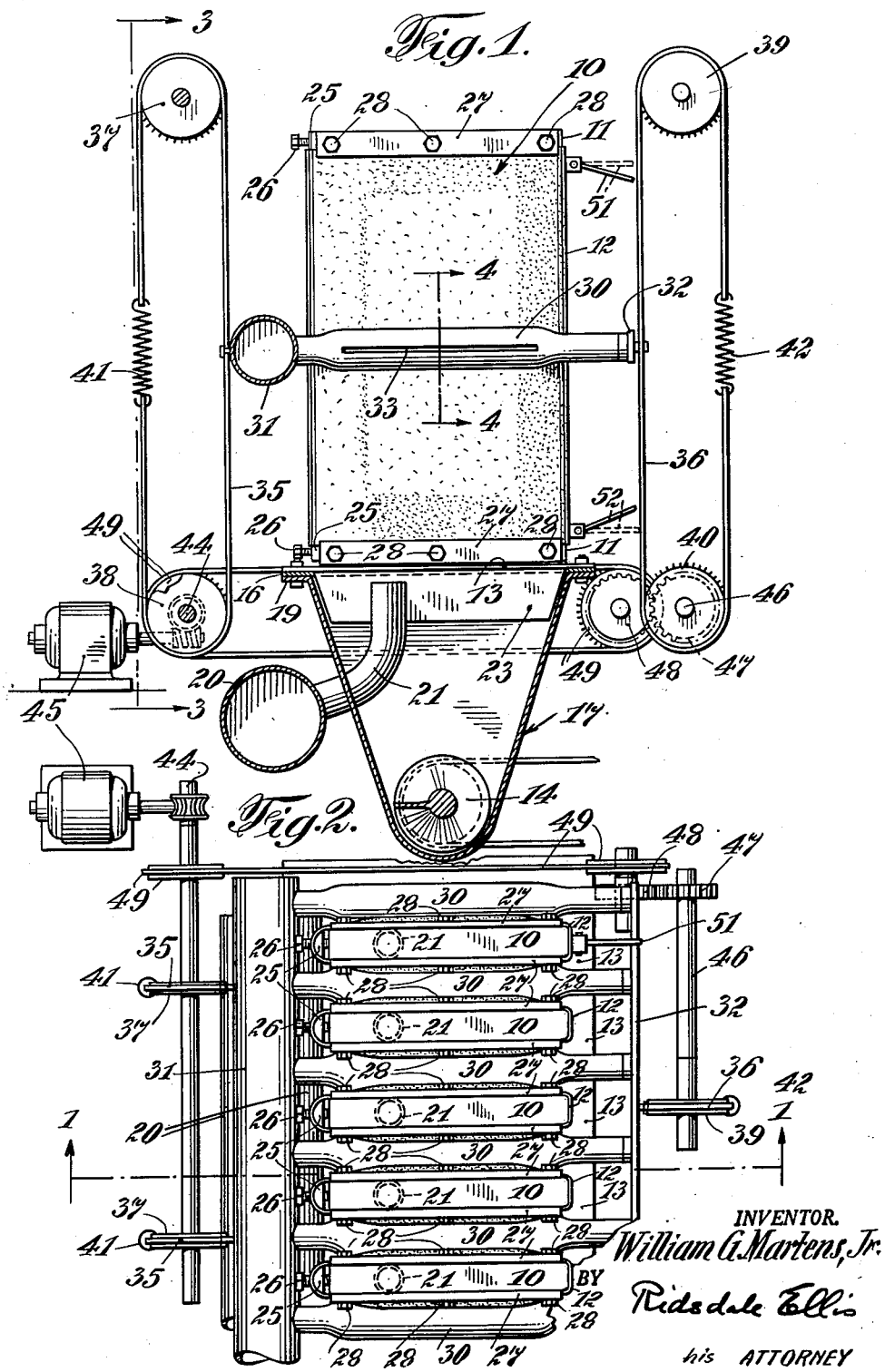

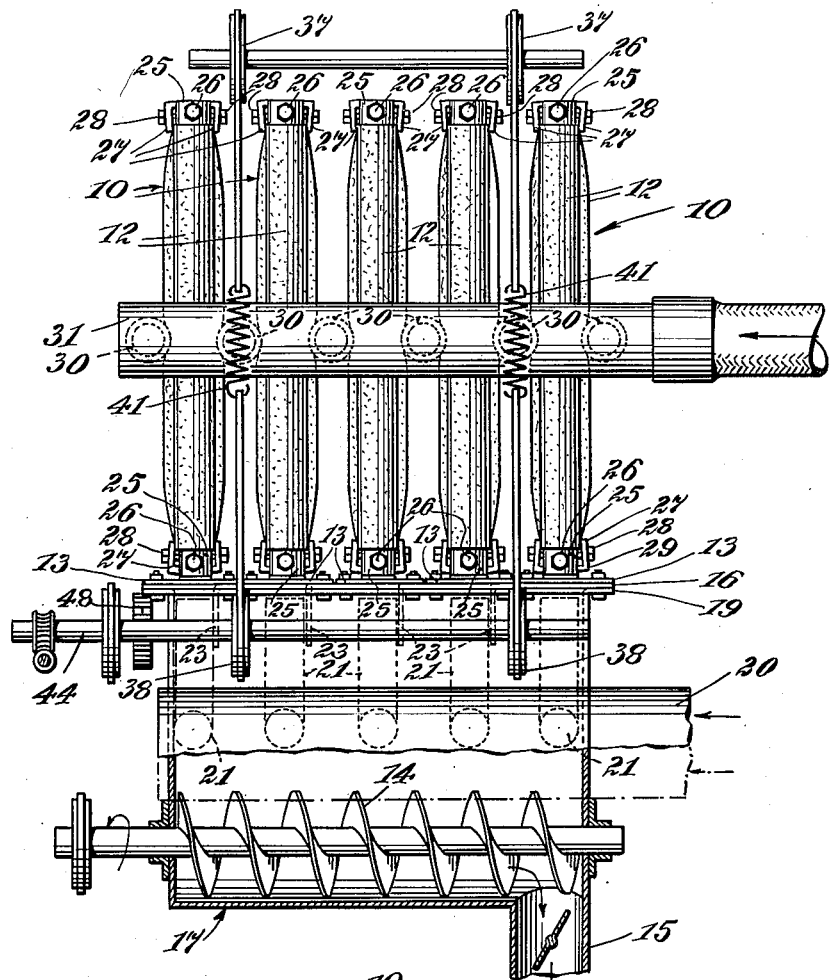
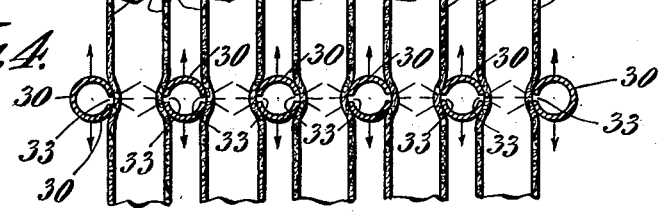

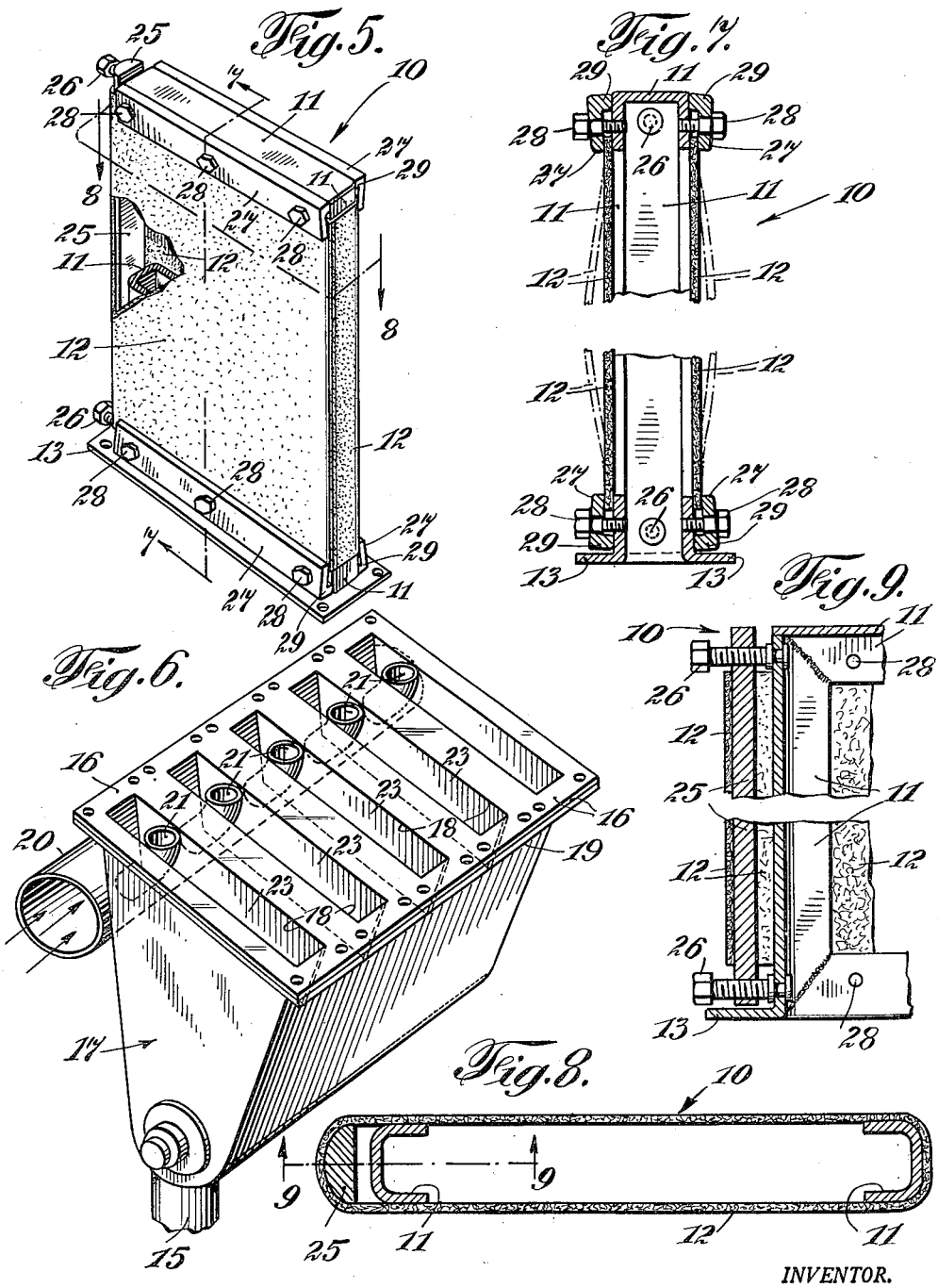

Patented Apr. 29, 1952

2,594,957

UNITED STATES PATENT OFFICE 2,594,957

MULTIPLE UNIT SELF-CLEANING DUST FILTER

William G. Martens, Jr., Chatham, N. J., assignor to Pulverizing Machinery Company, Summit, N. J., a corporation of New Jersey Application October 12, 1949, Serial No. 120,980

7 Claims. (Cl. 183—61)

This invention relates to self-cleaning dust filters of the type in which a cleaning-air tube is reciprocated to and fro over the outside surface of a filter medium to remove the material deposited on the inside surface of such medium.

Usually the filter medium is cylindrical in form and the air to be filtered is introduced into the interior of such cylinder. The cleaning-air tube in such cases consists of a ring whose inside diameter is slightly less than the outside diameter of the cylinder when distended.

Cylindrical filters of this type occupy considerable floor space per square foot of filter area and the principal object of this invention is to increase the ratio of filter area to floor area.

This object is attained by using a series of flat filter panels or elements with substantially parallel vertical sides formed of filter material, such as felt. Preferably, these flat filter elements are constructed by stretching a tube of filter material over a rectangular frame thereby utilizing all of the filtering area of the tube available in the earlier cylindrical form of filter except those parts of the tube in contact with the vertical portions of the frame. This loss in filtering area is, however, far more than offset by the diminution in floor space per square foot of filtering area. The saving in space results from, first, reducing the cross-sectional area inside each filter chamber and, second, cutting down the cross-sectional area outside such chambers.

The panels or elements are arranged in a row above a hopper with the filter surface of each pair opposing and parallel to each other. Between each of such opposing surfaces is a cleaning-air tube having slots on both sides so that as it is reciprocated to and fro over the adjacent filter surfaces, it cleans both such surfaces simultaneously. Each element is shallow and the distance between adjacent filter surfaces is small so that the filter area per square foot of floor space is large.

A suitable form of construction is illustrated, by way of example, in the accompanying drawings, wherein:

Fig. 1 is a vertical section through the filter on the line 1—1 of Fig. 2;

Fig. 2 is a top view of the same;

Fig. 3 is a side elevation partly in section;

Fig. 4 is a section on the line 4—4 of Fig. 1;

Fig. 5 is a perspective view of one of the filter elements;

Fig. 6 is a perspective view of the dust-collecting hopper;

Fig. 7 is a section on the line 7—7 of Fig. 5;

Fig. 8 is a section on the line 8—8 of Fig. 5; and

Fig. 9 is a section on the line 9—9 of Fig. 8.

As shown, the filter consists of five filter panels or elements 10, but this number may be increased or decreased to meet the capacity requirements of the apparatus. One of these elements is shown by itself in Fig. 5. Each element consists of a rectangular frame 11 open on both sides except for a narrow margin along all four edges. Over these openings are secured felt sheets 12.

At the bottom each element has an outwardly extending flange 13 which enables it to be bolted onto the removable top 16 of a dust-collecting hopper 17. The panels are open at the bottom and the top 16 of the hopper is provided with openings 18 in register with the openings in the bottoms of the elements so that the dust which is filtered out can fall down into the hopper. The hopper 17 has an outwardly extending flange 19 to which the removable top 16 is bolted. With this construction it is possible either to remove the individual elements from the top 16 without disturbing the others or to remove the top 16 with all the elements attached thereto for replacement by another top with new elements attached. This latter feature is convenient when it is desired to use the filter for a time on a new material and then switch back to the old or to another type of material. At the bottom of the hopper is a worm conveyor 14 for carrying the dust collected to a discharge spout 15.

The dust-laden gases are supplied by a manifold 20 running parallel to the hopper. From this manifold extend a series of discharge pipes or conduits 21. These pass through the hopper walls and are spaced so that their upper ends register with the slots 18 in the hopper top 16. So arranged, they project the dust-laden gases upwardly into the filter elements. To reduce eddying in the hopper which might interfere with the settling of the dust, it is helpful to attach a series of short partitions 23 to the underside of the hopper top 16 so that they are removed when the top is taken off, leaving the interior of the hopper open and unobstructed for cleaning purposes. By introducing the dust-laden gases from the bottom instead of at the top, there are no connections between the filter units and the manifold 20 or feeder-pipes 21 which have to be broken before a filter element can be removed for replacement of the filter material or other reason.

Filtration requires a pressure drop between the inside and the outside of the filter layer. This pressure difference causes the filter material to belly outwards. If the bellying is excessive, then the filter layers of adjacent elements will contact and filtration will cease in the contacting areas. The extent to which the filter material bellies out depends on its stretchability and on its tension. The greater its tendency to stretch, the greater the tension necessary. I have found that woven felt, i. e., a heavily milled woven fabric with a fibrous surface, stretches much less than matted felt. Impregnation with synthetic resins decreases the stretch of matted felt and I have found that the same is true of woven felt. Preferably, therefore, woven impregnated felt is used. Suitably the felt may be impregnated by dipping and then drying the felt in a 3½% solution of the copolymer of vinylidene chloride and acrylonitrile in methyl ethyl ketone or with a 3½% solution of polyvinyl chloride in acetone.

Another advantage of woven felt is that it is made commercially in seamless tubes which may be cut into lengths of the height of the filter panels. These lengths may be slipped over the panel frames and then stretched laterally. For this purpose stretcher bars 25 are arranged along one edge of each frame. Tensioning bolts 26 are provided at each end of each bar for forcing the bars 25 away from the frames with which they are associated and thereby drawing the felt taut along each side of the panels. Leakage of air top and bottom between the edges of the felt and the frame is prevented by clamping strips 27 attached to the tops and bottoms of the panels by bolts 28. Each of these strips has a shoulder or ridge 29 along one margin which is higher than the thickness of the felt so that when the bolts 28 are tightened, the opposite margin of the strip is pressed down and into the felt underneath.

For cleaning the filters a series of cleaning-air or blow tubes 30 are provided, one tube being located between each pair of elements and two others on the outsides of the end elements. Each tube has slots 33 therein for the discharge of cleaning air, as indicated in Fig. 4. It will be noted that all the tubes, except the end ones, have two slots located diametrically opposite each other so that each tube cleans two felt layers simultaneously.

One end of each tube is connected to a manifold 31. At the other end each tube is closed. The closed ends are connected together by a cross-bar 32. The whole forms a grid or frame which can be reciprocated vertically as a unit.

To secure proper contact between the tubes 30 and the felt layers to insure that the discharged air passes through the felt and does not escape laterally, the tubes 30 should have a large diameter with relation to the spacing of the elements. The limit in size is that they may be equal to but not greater than the space between the elements. To allow some swinging of the tubes to and from the elements during operation, the ends of the tubes opposite the sides of the element are made of smaller diameter than their slotted bodies. The clamping strips 27 are on the blow-tube side of the felt layers. That means that the space between the top and bottom of each element is considerably less than the space between its sides. Hence, if the diameter of the blow tube is only slightly less than the space between their sides, it will be in excess of the space between the elements at their top and bottom. Consequently, the blow-tube assembly cannot be dropped down or lifted off the battery of filter elements. The cross-bar 32 must be removed to allow the blow-tubes to be inserted horizontally. After they are in place the cross-bar is attached.

The blow-tube assembly is supported and reciprocated vertically by three chains 35, 35 and 36. The chains 35 pass around two pairs of sprockets 37 and 38. The chain 36 passes around the sprockets 39 and 40. Springs 41 and 42 inserted in these chains maintain the desired tension therein. The sprockets 38 are mounted on a shaft 44 driven by a worm and worm wheel by the motor 45. The sprocket 40 is mounted on shaft 46 driven from shaft 44 by gears 47 and 48 and a chain and sprocket assembly 49. The direction of rotation of the motor 45 is reversed as the blow-tube assembly reaches the top and bottom of its stroke by trip switches 51 and 52.

I claim:

1. A self-cleaning dust filter of the type having a cleaning-air tube adapted to be reciprocated to and fro over the surface of a filter medium, comprising two parallel, spaced, vertically arranged, rectangular frames, two sheets of flexible filter material stretched under tension across the adjacent sides of such frames, a cleaning-air tube between and in contact with both of such sheets, this tube being slotted on both sides so that air supplied to such tube cleans both sheets simultaneously, means for supplying dust-laden gases to the side of such sheets not in contact with said cleaning-air tube at a pressure greater than that between the sheets, and means for reciprocating said cleaning-air tube to and fro over said sheets.

2. A self-cleaning dust filter as in claim 1, in which the filter medium is under tension sufficient to prevent contact between the adjacent surfaces of said sheets under the pressure differential between the two sides of each sheet.

3. A self-cleaning dust filter of the type having a cleaning-air tube adapted to be reciprocated to and fro over the surface of a filter medium, comprising a series of filter elements of elongated rectangular cross-section arranged spaced apart in a row, with their long sides parallel, each of such sides having an opening covered by a flat sheet of filter material, a cleaning-air tube in the space between each pair of elements in contact with the sheets of filter material in both of such elements, said tube being slotted on both sides so that air supplied thereto cleans both sheets simultaneously, means for supplying dust-laden gases to the space in each element between the sheets of filter material on either side thereof at a pressure greater than that prevailing outside of said elements, and means for reciprocating said cleaning-air tubes to and fro over said sheets.

4. A self-cleaning dust filter of the type having a cleaning-air tube adapted to be reciprocated to and fro over the surface of a filter medium, comprising a series of filter elements, each of which comprises a vertical rectangular frame, sheets of filter material stretched laterally over both sides of such frame, said frame having openings on both sides for the passage of air to and through the filter material and an opening at the bottom for the discharge of the dust collected, a flange extending outwardly from the bottom of said frame, a trough-shaped hopper having a top provided with a series of slots therein for register with the openings in the bottoms of said series of filter elements, means for releasably securing the flanges at the bottoms of said elements to said top, a cleaning-air tube in the space between each pair of elements in contact with the sheets of filter material in both of such elements, said tube being slotted on both sides so that air supplied thereto cleans both sheets simultaneously, means for supplying dust-laden gases to the space in each element between the sheets of filter material on either side thereof at a pressure greater than that prevailing outside of said elements, and means for reciprocating said cleaning-air tubes to and fro over said sheets.

5. A self-cleaning dust filter as in claim 4 in which the top of the hopper is detachable and the hopper has an outwardly extending flange along both sides on which the edge of the top rests and to which it is releasably secured.

6. A self-cleaning dust filter of the type having a cleaning-air tube adapted to be reciprocated to and fro over the surface of a filter medium, comprising a series of filter elements, each of which comprises a vertical rectangular frame, sheets of filter material stretched laterally over both sides of such frame, said frame having openings on both sides for the passage of air to and through the filter material and an opening at the bottom for the discharge of the dust collected, a trough-shaped hopper having a top provided with a series of slots therein for register with the openings in the bottoms of said series of filter elements, means for releasably securing the said elements to said top, cleaning-air tubes in contact with the sheets of filter material in such elements, means for supplying air to said tubes, means for supplying dust-laden gases to the space in each element between the sheets of filter material on either side thereof at a pressure greater than that prevailing outside of said elements, and means for reciprocating said cleaning-air tubes to and fro over said sheets.

7. A self-cleaning dust filter as in claim 6 in which a manifold extends along one side of the hopper for dust-laden gases and conduits extend from said manifold through the wall of the hopper in register with the slots in the top of the hopper.

WILLIAM G. MARTENS, JR.

REFERENCES CITED

The following references are of record in the file of this patent:

UNITED STATES PATENTS

| Number | Name | Date |
| --- | --- | --- |
| 1,602,345 | Eiben | Oct. 5, 1926 |
| 1,957,560 | Thompson | May 8, 1934 |
| 2,072,906 | Rosenberger | Mar. 6, 1937 |

FOREIGN PATENTS

| Number | Country | Date |
| --- | --- | --- |
| 8,260 | Great Britain | Apr. 1, 1914 |
| 414,035 | Great Britain | July 20, 1934 |
| 296,128 | Germany | Jan. 13, 1917 |
| 737,109 | Germany | July 7, 1943 |